United States Patent [19]

Naganoma et al.

[11] 4,445,109
[45] Apr. 24, 1984

[54] TEMPERATURE SENSING DEVICE

[75] Inventors: Masanori Naganoma; Norio Maehara, both of Kariya; Masao Sakurai, Oobu; Minoru Hashimoto, Kariya; Kiyoshi Usami, Oobu, all of Japan

[73] Assignee: Nippondenso Co., Ltd., Kariya, Japan

[21] Appl. No.: 345,796

[22] Filed: Feb. 4, 1982

[30] Foreign Application Priority Data

Feb. 11, 1981 [JP] Japan .............................. 56-18368[U]

[51] Int. Cl.³ .............................................. H01C 7/10
[52] U.S. Cl. ................................. 338/22 R; 338/25; 338/28
[58] Field of Search ................... 338/22 R, 23, 25, 28, 338/22 SD, 275; 29/612, 613; 374/144, 145

[56] References Cited

U.S. PATENT DOCUMENTS

3,138,686  6/1964  Mitoff et al. .......................... 29/612
3,815,074  6/1974  Nagata .............................. 338/22 R

FOREIGN PATENT DOCUMENTS

48-5540    2/1973  Japan ................................... 338/23
1523738    9/1978  United Kingdom ................. 338/28

*Primary Examiner*—C. L. Albritton
*Attorney, Agent, or Firm*—Cushman, Darby & Cushman

[57] ABSTRACT

Temperature sensing device which has a temperature sensing part including a microchip thermistor in the form not greater than a very small thin piece having a volume of 2 mm³ as a temperature sensing element. The temperature sensing part is connected to an external circuit to which a temperature sense signal is to be transmitted, by lead wires, and the microchip thermistor is connected to the lead wires through fine lead wires having a wire diameter not greater than 0.5 mm.

2 Claims, 7 Drawing Figures

TEMPERATURE SENSING DEVICE

BACKGROUND OF THE INVENTION

The present invention relates generally to improvements in temperature sensing devices of the type employing a thermistor, and more particularly the invention relates to a temperature sensing device which is well suited for use in detecting the temperature of the air blown from an evaporator or the temperature at the surface of the evaporator fins in an automobile air conditioning system, although the device is not limited in applications in any way.

Conventionally, with automobile air conditioning systems it has been the practice so that the temperature of the air blown from the evaporator or the temperature at the surface of the evaporator fins is detected by a thermistor whereby when the detected temperature drops below a predetermined temperature, the electromagnetic clutch is disengaged and the operation of the compressor is stopped thus preventing the formation of frost in the evaporator.

However, this kind of known air conditioning system is disadvantageous in that as the compressor is operated intermittently, the resulting controlling temperature difference for the temperature of the air blown from the evaporator becomes as high as over 8° C. and hence the temperature of the air blown into the interior of the vehicle compartment is varied considerably thus deteriorating the feeling of air conditioning.

The inventors have conducted various experiments and studies on these problems and have discovered that in the known systems the thermistor element size is so large that the heat capacity of the entire temperature sensing device including the thermistor inevitably becomes large and the resulting thermal time constant indicative of a thermal response characteristic with respect to rapid temperature changes becomes about over 60 seconds, thus giving rise to the above-mentioned problems.

It has also been found that the heat from the parts external to the sensing section is transmitted to the thermistor by way of its external circuit connection lead wires thus further promoting the above-mentioned deficiencies.

SUMMARY OF THE INVENTION

With a view to overcome the foregoing deficiencies in the prior art, it is the primary object of the present invention to provide a temperature sensing device having an improved thermal response characteristic so as to quickly respond to rapid temperature changes.

The above object is accomplished by a temperature sensing device of this invention in which a sensing element comprises a microchip thermistor in the form of a very small thin piece not greater than 2 mm$^3$ cubic volume so as to improve the thermal response characteristic of the sensing element itself and the microchip thermistor is connected to external circuit connection lead wires by way not greater than fine wires of 0.5 mm or less in wire diameter so as to prevent as far as possible the transmission of external heat to the thermistor via the lead wires.

Thus, the temperature sensing device according to the present invention has among its great advantages the fact that its thermal time constant is reduced by virtue of its improved construction with the result that the response characteristic for temperature detection is improved greatly and the temperature control in an air conditioning system or the like is effected satisfactorily.

Another advantage of the device of this invention is that the overall configuration of the device is reduced in size making it easy to install the device in a limited space.

Still another advantage of the device of this invention is that the device is integrally coated with resin with the result that the microchip thermistor, the fine lead wires, etc., are reinforced structurally and also they are protected from external forces.

An embodiment of the invention will be described, by way of example, with reference to the accompanying drawings.

DESCRIPTION OF PREFERRED EMBODIMENT

The present invention will now be described in greater detail with reference to the illustrated embodiment.

Figure 1:
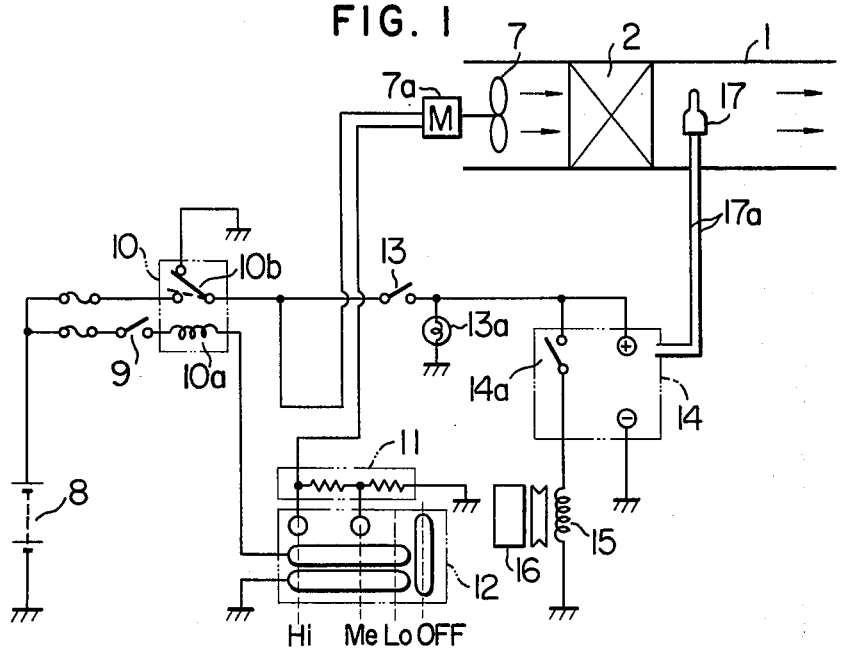
FIG. 1 is an electric circuit diagram of an automobile air conditioning system.
Figure 2:
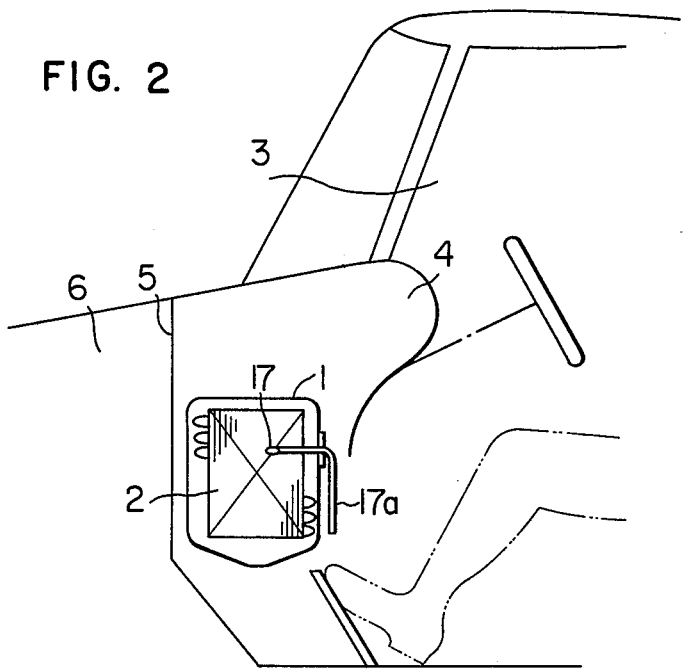
FIG. 2 is a schematic sectional view showing the manner in which the cooling unit shown in FIG. 1 is installed in an automobile.

Referring to FIGS. 1 and 2 showing the principal parts of an automobile air conditioning system incorporating a device of this invention, numeral 1 designates a cooling unit case which contains therein a refrigeration cycle evaporator 2. Usually, the case 1 is placed for example at a position below an instrument panel 4 inside a vehicle compartment 3 of the automobile. Numeral 5 designates a dash panel which separates the vehicle compartment 3 from an engine room 6.

Numeral 7 designates an air blower which is positioned upstream of the cooling unit and is driven by a motor 7a. The blower 7 draws in the inside or outside air through an inside/outside air selector box which is not shown and supplies the air into the cooling unit. The air is then passed through a heater unit which is not shown and the resulting conditioned air is blown into the vehicle compartment via upper and lower air outlets, etc.

Numeral 8 designates a vehicle power supply battery, 9 a vehicle engine ignition switch, and 10 a power supply relay comprising a coil 10a and a contact 10b. Numeral 11 designates a speed changing resistor for the blower motor 7a, and 12 a blower switch which also serves as a power supply switch for the air conditioning system. In this embodiment, the switch 12 is movable into any of four positions including stop (off), low speed (Lo), medium speed (Me) and high speed (Hi) positions. The power supply switch 10 is arranged so that only when the switches 9 and 12 are both closed, the coil 10a is energized and the contact 10b is attracted to the dottedline position.

Numeral 13 designates a refrigeration cycle actuation switch, and 13a an actuation indication lamp for the switch 13. Numeral 14 designates a temperature control circuit including an electronic circuit so designed that a relay contact 14a is opened and closed to switch on and off the flow of current to an electromagnetic clutch 15. The electromagnetic clutch 15 turns on and off the transmission of power between a refrigeration cycle compressor 16 and the vehicle engine (not shown). Numeral 17 designates a temperature sensing device which is positioned at the air outlet of the evaporator 2 within the cooling unit case 1 so as to sense the evaporator issuing air temperature (or the evaporator fin surface temperature) and it is connected to the temperature control circuit 14 by means of external circuit connection lead wires 17a.

Figure 3:
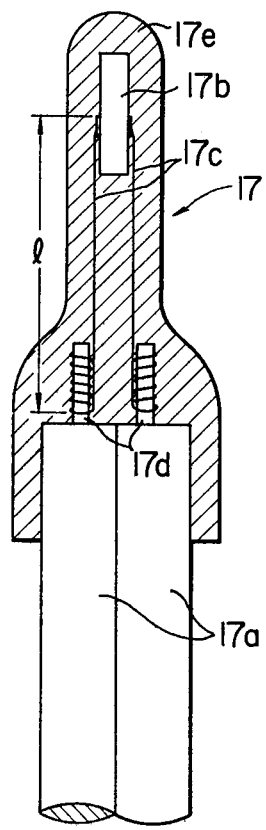
FIG. 3 is a sectional view showing the details of the temperature sensing device 17 shown in FIG. 1.
Figure 4:
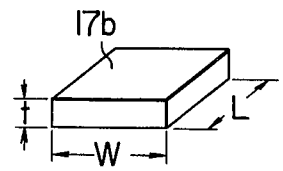
FIG. 4 is a perspective view of the thermistor 17b shown in FIG. 3.

Referring now to FIG. 3 showing the details of the temperature sensing device 17, numeral 17b designates a microchip thermistor which forms a sensing element of the sensing device and takes the form of a very small thin piece whose volume is selected to be not greater than 2 mm³ for the reasons which will be described later. In the present embodiment, the microchip thermistor 17b is formed into a rectangular shape as shown in FIG. 4 in which sides W and L are 2 mm and a thickness t is 0.5 mm and thus the volume is $2 \times 2 \times 0.5 = 2$ mm³. The two sides of the thermistor 17b are each formed with a thin-film gold electrode (not shown) and fine lead wires 17c made of solid copper single wire are connected at their one end to each of the gold electrodes by eutectic soldering. The wire diameter of the fine lead wires 17c is selected to be not greater than 0.5 mm for the reasons which will be described later. The other end of each of the fine lead wires 17c is wound on and soldered to a core wire 17d of an external circuit connection lead wire 17a. The core wires 17d each comprises an ordinary stranded copper wire having a wire diameter of about 0.8 mm.

Numeral 17e designates a coating of resin for electrically insulating the respective portions and also protecting the thermistor 17b and the fine lead wires 17c from external forces. The suitable materials for the resin coating 17e include for example epoxy resin and the resin coating 17e should preferably be applied in the form of a first coating applied to surround the thermistor 17b and the fine lead wires 17c after the completion of their soldering and a second coating applied to cover the whole as shown in FIG. 3 after the completion of the soldering of the lead wires 17c and the core wires 17d of the lead wires 17a.

In this embodiment, the external circuit connection lead wires 17a comprise parallel wires and thus there is an advantage that when the fine lead wires 17c are wound on the core wires 17d as well as when they are coated with resin, there is no danger of any external force being applied to the soldered joints of the fine lead wires 17c and the microchip thermistor 17b and thus the soldered joints are protected.

With the construction described above, the operation of the device will now be described. The thermistor 17b of the temperature sensing device 17 has a negative resistance-temperature characteristic and its detection signal is applied to the temperature control circuit 14. As a result, when the temperature detected by the thermistor 17b drops to a preset temperature (e.g., 3° C.), the relay contact 14a of the temperature control circuit 14 is opened and the current flow to the electromagnetic clutch 15 is interrupted and the compressor 16 is stopped. When this occurs, the formation of frost in the evaporator 2 is prevented and the temperature in the evaporator 2 increases gradually. Thus when the temperature detected by the thermistor 17b rises to another preset temperature (e.g., 4° C.), the relay contact 14a of the temperature control circuit 14 is closed and the compressor 16 is operated again.

By thus operating the compressor 16 intermittently, the temperature of the air blown from the evaporator 2 is controlled so as to be maintained higher than the preset temperature.

In this case, since the evaporator issuing air temperature is controlled by the thermistor 17b in accordance with its detected temperature, the thermal response characteristic of the thermistor (this is given in terms of a thermal time constant in this embodiment) with respect to temperature changes has a considerable effect on the temperature control. In other words, while the controlling temperature difference is theoretically given by the difference between the previously mentioned values or $4° C. - 3° C. = 1° C.$, actually this value is increased considerably due to a delay in the thermal response of the thermistor 17b.

Figure 5:
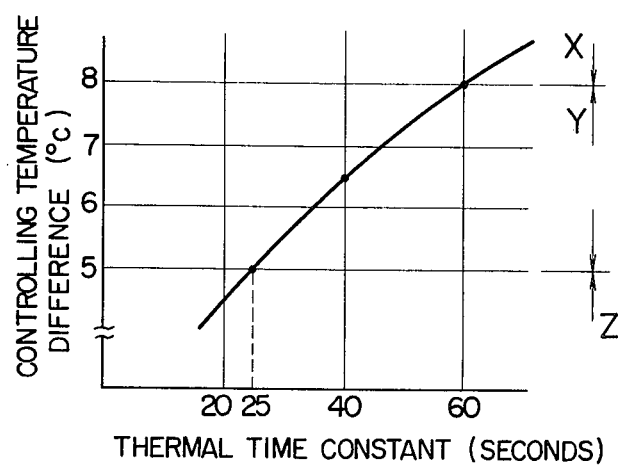
FIGS. 5, 6 and 7 are graphs showing the results of the experiments conducted by inventors.

The experiments conducted to examine the relation between the thermal time constant and the controlling temperature difference of the evaporator issuing air temperature showed the results shown in FIG. 5. More specifically, if the thermal time constant exceeds 60 seconds (comes into a region X), the controlling temperature difference becomes over 8° C. thus causing a considerable variation in the temperature of the air blown into the vehicle compartment. If the thermal time constant comes into a region Y ranging from 25 to 60 seconds, the controlling temperature difference becomes 5° to 8° C. so that only a slight temperature difference is felt at the air outlet to the vehicle temperature. If the thermal time constant comes into a region Z of less than 25 seconds, the controlling temperature difference becomes less than 5° C. so that practically no temperature difference is felt at the air outlet to the vehicle compartment.

Thus, in accordance with the above-mentioned experimental results it is necessary to keep the thermal time constant 25 seconds or less in order to reduce the temperature difference of the issuing air and thereby to ensure a comfortable feeling of air conditioning.

Figure 6:
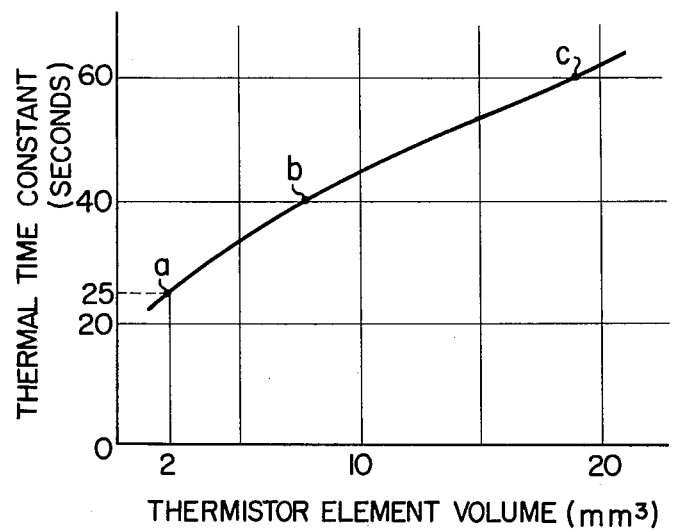

In accordance with the present invention the relation between the thermal time constant and the volume of the sensing element or the thermistor element itself was noted and confirmed experimentally, thus obtaining the results shown in FIG. 6. In other words, in FIG. 6 indicated at a is the microchip thermistor 17b according to the invention and it has a volume of 2 mm $\times$ 2 mm $\times$ 0.5 mm = 2 mm³ and a thermal time constant of about 25 seconds. Also indicated at b and c are comparative thermistor elements of which the thermistor element b has a circular shape of 4 mm in diameter and 0.6 mm in thickness and it also has a volume of about 7.54 mm³ and a thermal time constant of 40 seconds. The thermistor element c is of the circular shape having a diameter of 5 mm and thickness of 1 mm and it also has a volume of about 19.63 mm³ and a thermal time constant of 60 seconds.

The fine lead wires 17c of 0.3 mm in wire diameter are connected to the microchip thermistor 17b of this invention used in the experiments of FIG. 6. This is necessary to prevent the thermistor element from being affected by the external heat which is transmitted via the lead wires 17a and the experiments according to the invention have shown that by selecting the wire diameter of the fine lead wires 17c to be not greater than 0.5 mm, it is possible to reduce the effect of transmission of the external heat to a very small value.

Particularly, when used in an automobile air conditioning system, the external circuit connection lead wires 17a will be positioned to the outer side of the case 1 as shown in FIG. 2 and will tend to be affected by the external heat, thus making important the use of the above-mentioned fine lead wires 17c.

Figure 7:
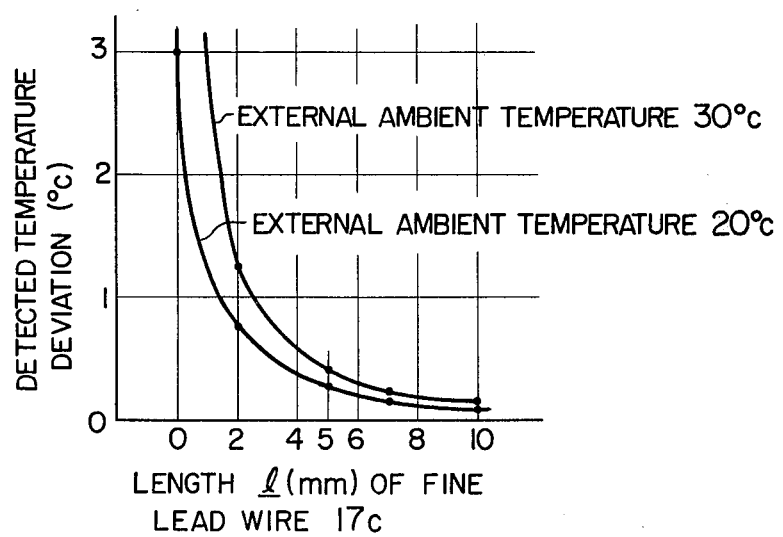

The length l of the fine lead wires 17c can also be selected suitably to be effective in further reducing the effect of the external heat and in accordance with the experiments with this invention the length l should preferably be selected to be not shorter than 5 mm as shown in FIG. 7. However, to select the length l to be greater than 10 mm is not practical from the standpoint of reducing the size of the device on the whole.

It should be apparent to those skilled in the art that the invention is not intended to be limited to the above-described embodiment and many modifications and changes can be made thereto and that the invention is applicable not only to automobiles but also to various other fields.

Further, the microchip thermistor 17b is not limited to the rectangular shape and it can be formed into any other shape such as circular shape.

Further, the fine lead wires 17c are not limited to solid wires and they may comprise stranded wires.

We claim:

1. A temperature sensing device, comprising:
    a temperature sensing part including a microchip thermistor in the form of a very small thin piece having a volume not greater than 2 mm$^3$;
    first lead wires formed by fine wires of a diameter not greater than 0.5 mm and having one end of each thereof connected to said microchip thermistor in said temperature sensing part;
    second lead wires having ends thereof connected respectively to the other ends of said first lead wires, thereby connecting said temperature sensing part to an external electric circuit; and
    an integral coating of resin applied in part to said microchip thermistor, said fine lead wires and said external circuit connection lead wires.

2. A device according to claim 1, wherein, each of said fine lead wire has a length not shorter than 5 mm.

* * * * *